United States Patent Office 2,809,195
Patented Oct. 8, 1957

2,809,195

SYNTHESIS OF PIPERAZINE AND SUBSTITUTED PIPERAZINES

William R. Miller, Niagara Falls, N. Y., assignor to E. I. du Pont de Nemours and Company, Wilmington, Del., a corporation of Delaware No Drawing. Application August 30, 1955, Serial No. 531,595

13 Claims. (Cl. 260—268)

This invention relates to the synthesis of piperazine and of alkylated piperazines by the cyclization of diethylene triamine.

Piperazine has been produced heretofore by the catalytic deamination or cyclization of diethylenetriamine. Thus Martin et al., J. Am. Chem. Soc. 70, 1817–18 (1948), show several instances of the reaction carried out under reflux with Raney nickel. The equation for the deamination may be written as:

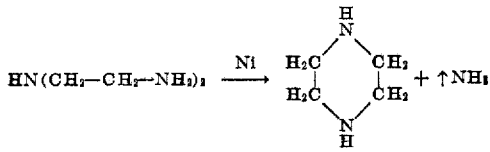

While Martin and his co-workers show fairly good yields, they operate only in batch processes. Since they require several hours to cyclize each batch, their methods are not readily adaptable for continuous use.

A general object of this invention is, consequently, to provide improvements in the process of synthesizing piperazine from diethylenetriamine.

Another object is provision of a method for accomplishing the aforesaid synthesis rapidly.

A further object is provision of a continuous process for synthesizing piperazine.

A corollary object is provision of a method for synthesizing alkylated piperazines by deaminating diethylenetriamine under controlled conditions.

The above-mentioned objects, and yet others which will be apparent from the remainder of the specification, are achieved in accordance with this invention by a process in which diethylenetriamine, admixed with a reaction solvent, is continuously contacted with Raney nickel under conditions usually employed for hydrogenation. If the solvent is relatively inert, like tetrahydrofuran, piperazine is almost the only product. If the solvent is relatively active, like methanol or ethanol, alkylated piperazines result. In either type of solvent the yield is improved if preformed ammonia is also present. The last-mentioned phenomenon is quite surprising since ammonia is one of the reaction products.

The process is carried out very simply by passing the reaction mixture and hydrogen through the catalyst. The variables most important in obtaining a good yield are the catalyst, the temperature, the pressure, the solvent, the presence and concentration of ammonia in the solvent, the concentration of reactant in the solvent and the hold-up time or rate of flow.

The catalyst required for the cyclization of this invention is quite specific. Nothing other than nickel has been found effective. Nickel may be used in any of its metallic forms but Raney or foraminous nickel is preferred. This catalyst is an alloy of nickel and aluminum easily activated by dissolving out part of the aluminum with sodium hydroxide. The proportion of metals in the alloy is not critical so long as some nickel is present. Standard commercial alloys in the 40:60—60:40 Ni:Al weight range are quite good but catalysts having proportions outside this range are also acceptable.

The temperature required for the present process is between about 175° C. and 225° C. Around 200° C. is preferred.

To obtain the best results from the present invention, reaction in the liquid phase is desirable. Since the temperature necessary is above the normal boiling point of the solvents, pressure is required. Around 4,500 p. s. i. g. is preferred but about any pressure between 3,000 and 5,000 p. s. i. g. is satisfactory. The pressure required in the cyclization is preferably supplied by hydrogen. Inert gases such as neon, argon, krypton, hydrogen and the like may be substituted for hydrogen or autogenous pressure may be employed. The highest yields, however, are obtained with hydrogen.

Solvents useful in the reaction may be divided into two types. The first type includes non-alcoholic, saturated ethers such as tetrahydrofuran, diethyl ether, dioxan and the like which are truly inert to the reaction. Since these solvents should also be easily separable from the products, some inert liquids, such as methyl "Cellosolve," are not desirable. The primary functions of the inert solvents are to dilute the diethylenetriamine and to assist in controlling the reaction. Inert solvents seem also to aid in obtaining yields higher than those previously reported.

The second type of solvent not only dilutes the reactant but actively participates in the reaction. This type consists of lower alcohols, such as methyl, ethyl, propyl, isopropyl, amyl and the like, which dissolve diethylenetriamine. In general monohydric alcohols containing up to about eight carbon atoms react as indicated. The product is an alkylated piperazine. With methyl alcohol a mixture of mono- and dialkylated piperazines is obtained. With ethanol N,N'-diethylpiperazine is formed. Some nonalkylated piperazine may also be obtained in these alcoholic solvents.

It will be apparent that mixtures of inert and active solvents may also be used. No particular advantages result from these mixtures although the percentages of alkylated compound in the product is lessened with the decrease in alcohol.

Improved yields are obtained in both inert and active solvents when preformed ammonia is added thereto. Between about 5 and 15% by weight of the solvent should comprise ammonia for best results. About 10% by weight is preferred.

The concentration of diethylenetriamine in the solvent may vary to some extent. For ease in control of the reaction rate, a solution containing about 5–10% by weight of the reactant is preferred. Up to about 50% may, however, be employed if it is so desired. These quantities are appropriate for either inert or active solvents. In either case, the solvent should, as noted, include 5–15% by weight of ammonia.

The cyclization to piperazine takes place rather slowly. Consequently relatively low space velocities or long hold-up times are desirable. For complete reaction the space velocity should be not much greater than about 2–3 v./v./h., i. e., 2–3 volumes of reaction mixture per volume of catalyst per hour. Higher velocities may, of course, be employed but at the cost of somewhat impaired yield.

There follow some examples which illustrate the invention in more detail. In these examples the percentages given are weight percentages.

EXAMPLE 1

This example illustrates the use of an inert solvent in the cyclization or deamination reaction.

790 g. of a catalyst was prepared in the one-inch reactor tube of a continuous hydrogenation unit by treating a 6–10 mesh Raney nickel containing 50% aluminum with 1% sodium hydroxide solution until 40% of the aluminum was dissolved. The reaction of the aluminum was followed by the evolution of hydrogen. The treated catalyst was washed with distilled water until neutral, dried and stored under nitrogen until used.

To initiate the deamination run, hydrogen pressure on the unit was adjusted to 4,500 p. s. i. g. and the catalyst heated to 200° C. Conditions were stabilized by pumping ammoniacal tetrahydrofuran through the unit. A feed mix of 100 g. of diethylenetriamine in a mixture of 100 ml. of ammonia and 1,900 ml. of tetrahydrofuran was then pumped over the catalyst at a rate of 0.6 liter per hour.

Distillation of the product gave a 32% recovery of diethylenetriamine and a 67% yield of piperazine.

EXAMPLE 2

This example shows the use of ethanol as an active solvent.

The cyclization was carried out in the same manner as in Example 1 except that the feed mix was made up of 100 g. of diethylenetriamine in a mixture of 100 ml. of ammonia in 1,900 ml. of ethanol. The mix was pumped over the catalyst at the rate of 1.1 liters per hour.

Distillation of the product gave no piperazine but a liquid boiling at 155–173° C. Diethylenetriamine (25%) was also recovered. The product would not form a benzamide but did form a picrate melting at 217–18° C. This analyzed as the dipicrate of N,N'-diethylpiperazine.

*Analysis*

|  | C | H | N |
|---|---|---|---|
| Calcd. for $C_{20}H_{24}N_8O_{14}$ | Percent 39.99 | Percent 4.03 | Percent 18.66 |
| Found | 40.42 | 4.31 | 18.06 |

The net yield was 91%.

EXAMPLE 3

This example shows the use of methanol as the solvent.

The cyclization was carried out as in Example 2 except that methanol was used in place of ethanol. The product was a mixture of piperazine and N-methylpiperazines. Sixteen percent of the diethylenetriamine was recovered and the combined yield of piperazine and N-methylpiperazines was 66%.

Having described my invention, I claim:

1. The method of synthesizing a piperazine which comprises heating diethylenetriamine under pressure at about 175°–225° C. in a non-aqueous solvent initially containing about 5–15% ammonia in the presence of a nickel catalyst.

2. The method of synthesizing a piperazine of the formula $RN(CH_2CH_2)_2NR'$, wherein R and R' are selected from the group consisting of hydrogen and alkyl groups containing 1–8 carbon atoms, which comprises heating diethylenetriamine under pressure at about 175°–225° C. in a solvent selected from the group consisting of aliphatic ethers and aliphatic alcohols containing 1–8 carbon atoms, said solvent initially containing about 5–15% by weight of ammonia in the presence of a nickel catalyst.

3. The process of claim 2 in which the reaction is carried out in the presence of hydrogen at a pressure of 3000–5000 p. s. i. g.

4. The process of claim 3 in which the concentration of diethylenetriamine in the solvent is about 5 to 10% by weight.

5. The method of synthesizing piperazine which comprises heating at about 5–10% by weight solution of diethylenetriamine in an aliphatic ether initially containing about 5–15% by weight of ammonia at 3000–5000 p. s. i. g. pressure and about 175–225° C. in the presence of hydrogen and a nickel catalyst.

6. The method of claim 5 in which the solvent is tetrahydrofuran.

7. The method of synthesizing N-alkylpiperazines containing 1 to 2 N-alkyl groups of 1 to 8 carbon atoms which comprises heating diethylenetriamine under pressure at about 175–225° C. in an aliphatic alcohol containing 1 to 8 carbon atoms in the presence of a nickel catalyst.

8. The method of claim 7 in which the alcohol initially contains about 5–15% by weight of ammonia.

9. The method of claim 8 in which the alcohol contains about 5–10% diethylenetriamine and the reaction is carried out in the presence of hydrogen at a pressure of 3000–5000 p. s. i. g.

10. The method of synthesizing N,N'-diethyl piperazine which comprises heating at about 5–10% by weight ethyl alcohol solution of diethylenetriamine at about 175 to 225° C. and about 3000–5000 p. s. i. g. pressure in the presence of hydrogen and a nickel catalyst.

11. The process of claim 10 in which the ethyl alcohol initially contains about 5–15% by weight of ammonia.

12. The method of synthesizing N-methyl piperazines containing 1 to 2 N-methyl groups which comprises heating at about 5–10% by weight methyl alcohol solution of diethylenetriamine at about 175 to 225° C. and about 3000–5000 p. s. i. g. pressure in the presence of hydrogen and a nickel catalyst.

13. The process of claim 12 in which the methyl alcohol initially contains 5–15% by weight of ammonia.

References Cited in the file of this patent

UNITED STATES PATENTS

| 2,267,686 | Kyrides | Dec. 23, 1941 |
| 2,605,263 | Culver et al. | July 29, 1952 |

OTHER REFERENCES

Richter: Textbook of Organic Chemistry (1938 edition), page 217.

UNITED STATES PATENT OFFICE

CERTIFICATE OF CORRECTION

Patent No. 2,809,195                          October 8, 1957

William R. Miller

It is hereby certified that error appears in the printed specification of the above numbered patent requiring correction and that the said Letters Patent should read as corrected below.

Column 4, lines 15, 34 and 42, for "at about", each occurrence, read -- an about --.

Signed and sealed this 26th day of November 1957.

(SEAL)
Attest:

KARL H. AXLINE
Attesting Officer

ROBERT C. WATSON
Commissioner of Patents